UNITED STATES PATENT OFFICE.

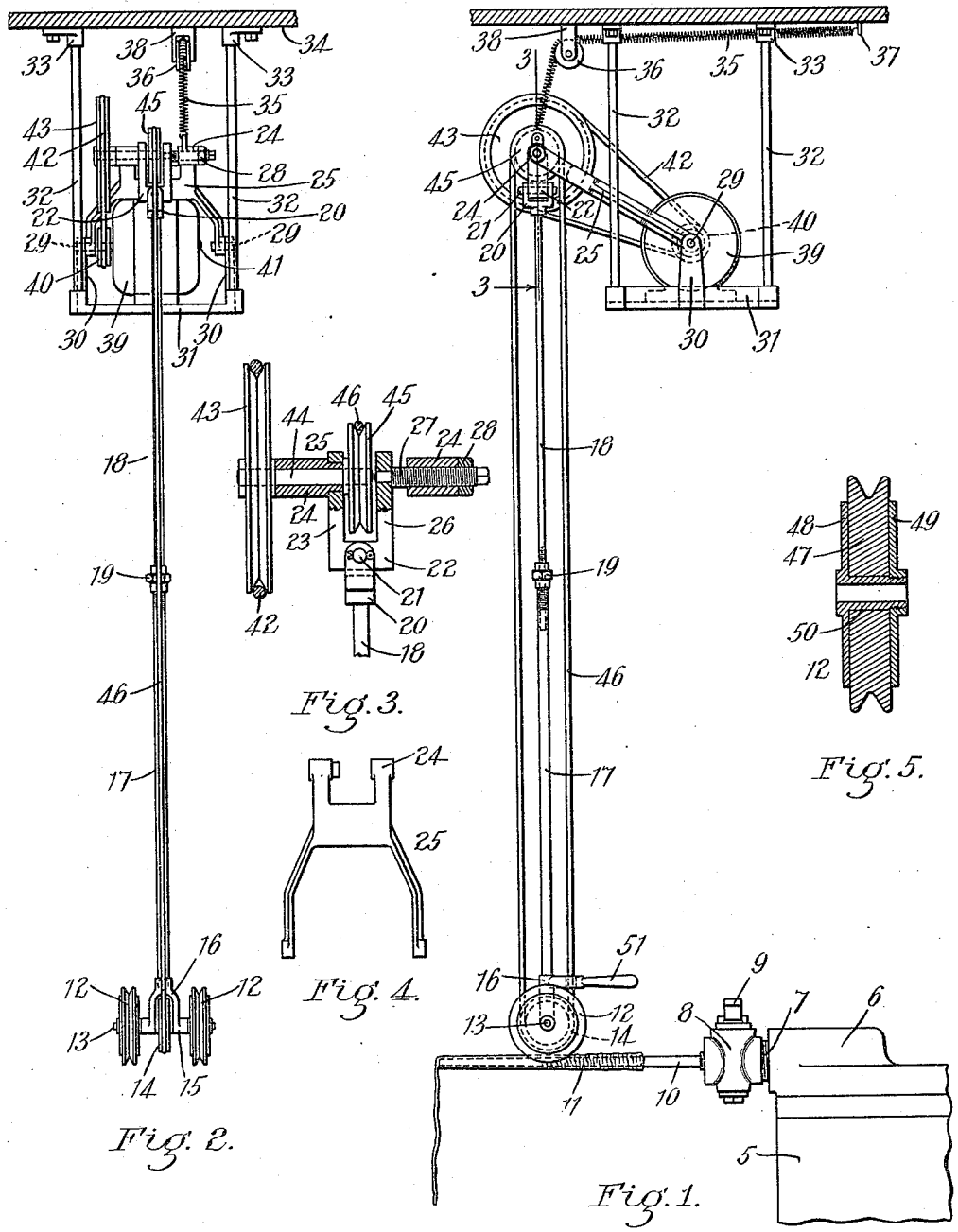

WILLIAM F. SCHÖNLAND, OF MANCHESTER, NEW HAMPSHIRE.

MECHANISM FOR TRANSMITTING POWER.

1,184,386. Specification of Letters Patent. Patented May 23, 1916.

Application filed January 20, 1914. Serial No. 813,307.

*To all whom it may concern:*

Be it known that I, WILLIAM F. SCHÖNLAND, a citizen of the United States, residing at Manchester, in the county of Hillsboro and State of New Hampshire, have invented new and useful Improvements in Mechanism for Transmitting Power, of which the following is a specification.

This invention relates to mechanism for transmitting power and is particularly adapted to be used in connection with machines for filling sausage casings. In machines of this class the skin of sausage is fed onto a filling tube preparatory to filling the same with sausage meat. The empty sausage casing is fed onto the tube by the mechanism hereinafter described by means of a rapidly rotating feed wheel having a grooved periphery which engages the sausage casing on the tube and moves the same along said tube until all of the casing has been placed thereon, whereupon it is desirable to remove the feed wheel from contact with the sausage casing, and by opening the valve from the filling machine fill the casing through the filling tube in a manner well known to those skilled in this art. The filling machine is provided with a plurality of tubes, and usually two operatives stand upon opposite sides of a bench upon which said filling machine is placed, and these operatives use the feeding mechanism alternately, and therefore, it is desirable in a mechanism of the class set forth that the feed wheel should be capable of being moved upwardly and also laterally in order that it may be, respectively, moved out of contact with the filling tube and the casing thereon, and swung to one side to be placed in contact with another casing and its filling tube.

To secure these various requirements in a practical and durable mechanism is the object of this invention.

The invention consists in the combination and arrangement of parts set forth in the following specification and particularly pointed out in the claim thereof.

Referring to the drawings: Figure 1 is a front elevation of my improved sausage filling machine, the tank containing the filling being broken away to save space in the drawings. Fig. 2 is a side elevation of the same as viewed from the left of Fig. 1. Fig. 3 is a sectional elevation taken on line 3—3 of Fig. 1. Fig. 4 is a detail plan of the rocker frame. Fig. 5 is a detail section of one of the feed wheels.

Like numerals refer to like parts throughout the several views of the drawings.

In the drawings, 5 is a tank containing the sausage meat, 6 is the top of said tank and 7 an outlet to which is attached a valve 8 which is opened and closed by means of a handle 9 and has a filling tube 10 extending therefrom upon which the sausage casing 11 is fed preparatory to being filled by the opening of the value 8.

Two feed wheels 12 are fastened to a shaft 13 which is rotated by means of a pulley 14 fast thereto. The shaft 13 is rotatably mounted in the carrier frame 15 which consists of a U-shaped bracket 16 fastened to a tube 17, said tube being fastened to a rod 18 which extends thereinto and which is connected thereto by means of a union 19. The rod 18 at its upper end is fastened to a bracket 20 which is pivoted at 21 to a U-shaped arm 22. One of the arms 23 of the U-shaped arm 22 is pivoted directly to the free end 24 of the rocker frame 25; the other arm 26 of said U-shaped arm is pivoted to a stud 27 which has screw-threaded engagement with the free end of the rocker frame 25 and is securely locked in position by a lock-nut 28. The rocker frame 25 is pivoted at 29 to brackets 30 which are fastened to a platform 31 supported by rods 32 from brackets 33 fast to the ceiling 34 of the room in which the mechanism is installed. A spring 35 is attached at one end thereof to the rocker frame 25 and passes upwardly therefrom over a guide roll 36, the other end of said spring being fastened to an eye 37 fast to the ceiling 34. The roll 36 is rotatably mounted upon a bracket 38 also fastened to said ceiling.

A motor 39 is fastened to the platform 31 and has a driving pulley 40 fast to the driving shaft 41 of said motor. The pulley 40 is connected by a belt 42 to a pulley 43 fastened to a driven shaft 44 journaled in the free end 24 of the rocker frame 25. Another pulley 45 is fastened to the driven shaft 44 at the opposite end thereof from that at which the pulley 43 is fastened and said pulley 45 is connected by a belt 46 to the pulley 14, whereby the shaft 13, with the feed wheels 12, is rotated. The feed wheels 12 are preferably made, as illustrated in Fig. 5, of a central portion 47 of cork and having a grooved periphery. This cork central portion is held between two flanges 48 and 49, the flange 48 having a hub 50 thereon which extends through the cork central portion 47 and has screw-threaded engagement with the flange 49. It will be noted that the driving shaft 41 of the motor 40 is concentric with the pivots 29 of the rocker frame 25. The parts 16, 17, 18 and 20 form the lower part and the U-shaped arm 22 forms the upper part of a vertically disposed carrier frame, the lower part being pivoted at 21 to the upper part and the upper part being pivoted to the free end 24 of the rocker frame 25. The U-shaped arm 22 is pivoted to the rocker frame to swing about the median axial line of the driven shaft 44, while the lower part of the vertically disposed carrier frame is pivoted at 21 to swing in a plane extending parallel to said shaft. The upper and lower parts of the carrier frame being pivoted to respectively rock in planes at right angles to each other makes it possible to move the carrier frame longitudinally of the filling tube 10 and also transversely thereof so as to bring one of the wheels 12 into operation on one tube 10 and then to bring the other wheel 12 in contact with another similar tube, 10. The rocker frame 25 makes it possible to raise and lower the feed wheel 12 to any desired extent and the weight of said rocker and carrier frames, together with the pulleys and belting thereon, is counterbalanced by means of the spring 35.

In operation, the operator starts the casing 11 on the tube 10, then grasps the handle 51 and lowers one of the feed wheels 12 until its periphery contacts with the casing 11 on the filling tube 10. This roll being rapidly rotated causes the casing to be fed onto the filling tube 10, whereupon the operator releases the mechanism and the spring 35 draws the feed wheel 12 away from the casing and the filling tube. The other operator then grasps the handle 51 and swings the vertically disposed carrier frame over until the other feed wheel 12 is above the filling tube upon which he intends to place a casing and then lowers the carrier frame, together with its feed wheel 12, until it engages a casing 11 on another tube (not shown in the drawings, but similar in every respect to the tube 10 and casing 11 shown in Fig. 1), and this operation is performed alternately by the two operators.

Having thus described my invention, what I claim and desire by Letters Patent to secure is:

A mechanism for transmitting power having, in combination, a stationary frame, a motor supported on said stationary frame, a driving shaft for said motor, a rocker frame pivotally supported on said stationary frame concentrically with said driving shaft, a shaft journaled in the free end of said rocker frame, a U-shaped arm pivoted to said rocker frame and adapted to swing about the median axial line of said last-named shaft, a pivot on said U-shaped arm extending transversely of said last-named shaft, a vertically disposed carrier frame mounted at its upper end on said pivot, a shaft journaled to rotate on the lower end of said carrier frame and parallel to said last-named shaft, a rotary member fast to said last-named shaft, mechanism mounted on said frames and connecting said motor to said rotary member whereby the same may be rotated, and means attached to said carrier frame adapted to counterbalance the weight of said mechanism and frames.

In testimony whereof I have hereunto set my hand in presence of two subscribing witnesses.

WILLIAM F. SCHÖNLAND.

Witnesses:
ANDREAS SCHREIKER,
JOHN NEWLEY.